Patented Nov. 7, 1950

2,528,523

UNITED STATES PATENT OFFICE 2,528,523

PROCESS FOR EXTRUDING AND INSOLUBILIZING POLYMERS OF ETHYLENE

Robert Eugene Kent, Upper Montclair, N. J., assignor to E. I. du Pont de Nemours & Company, Wilmington, Del., a corporation of Delaware No Drawing. Application June 12, 1948, Serial No. 32,739

9 Claims. (Cl. 18—47.5)

This invention relates to a process employing cross-linking thermoplastic compositions, and more particularly, cross-linking compositions essentially composed of a normally solid polymer of ethylene.

The normally solid polymers of ethylene described in Fawcett U. S. Patent 2,153,553 and widely known in the art as polythene, are thermoplastic and of the soluble type, i. e., they are soluble in boiling trichloroethylene. For the sake of definiteness, the term "soluble" as used herein with reference to polymers connotes solubility in boiling trichloroethylene. In U. S. application Serial No. 625,110, filed October 27, 1945, in the names of Pinkney and Wiley, entitled "Curing of Polyethylenes," there is described a method of curing these soluble polymers, that is, converting them to insoluble polymers by cross-linking, such method comprising heating the soluble polymer in the presence of a free-radical producing substance at temperatures up to 250° C. Such cured or cross-linked polymers are advantageous in several respects, particularly in their increased resistance to deformation under load at elevated temperature.

The method above for curing polymers of ethylene is disadvantageous under some conditions in that, when the curing agents which are preferably organic peroxides, are incorporated in the polymer before it is formed, and this is the procedure preferably followed in most instances, the composition "sets up" in the extrusion machine, mold, or other apparatus used to form the polymer into shaped articles. While this premature "setting up" is disadvantageous to varying degrees depending upon the method used for shaping the polymer and the particular article being formed, it presents a most serious problem when it is desired to obtain a smooth extruded insulation coating on wire. It has been found substantially impossible to extrude a smooth coating on wire using the curing agents disclosed in the abovementioned application.

An object of the present invention is to employ ethylene polymer compositions capable of being cross-linked after shaping and other fabrication. A further object is to provide a practical and economical process for reducing the deformation of ethylene polymer plastic under load at elevated temperatures. A further object is to provide a method of cross-linking ethylene polymer plastic directly after the shaping operation. Other objects will be apparent from the description of the invention given hereinafter.

The above objects are accomplished according to the present invention by the use of a normally solid, soluble polymer of ethylene containing 1%–10%, by weight thereof, of a tertiary peroxide of the formula R—O—O—R' wherein R and R' are saturated, non-aromatic hydrocarbon radicals, the carbon atom attached to each oxygen atom of the peroxide linkage is tertiary, and the sum of the carbon atoms in R and R' is at least eleven and, preferably, is from eleven to sixteen, inclusive. It is preferred that the proportion of tertiary peroxide be 2%–5% by weight of the polymer.

The present invention further comprises shaping the polymer containing the tertiary peroxide at a temperature of 110° C.–180° C., preferably 150° C.–180° C., and thereafter heating the shaped polymer at 180° C.–250° C., preferably 190° C.–210° C., until at least 50% of the polymer is insoluble in boiling trichloroethylene.

This invention resides primarily in the discovery that the herein considered tertiary peroxides may be incorporated in soluble ethylene polymer and such polymer shaped by the conventional procedures in the art without "setting up" or cross-linking of the polymer and the difficulties attendant thereupon but the polymer may be readily cross-linked by a relatively brief heat treatment thereafter to give a shaped article of greatly reduced deformation under load at elevated temperature. The invention is particularly applicable to wire coating since the property of the composition allowing it to be extruded on wire without cross-linking, tremendously facilitates the extrusion of a smooth coating on the wire and yet by subsequent heat treatment the polymer is cross-linked so that a coating having the inherent advantages of a cross-linked polymer coating is obtained.

The preparation of the polymer composition of this invention will vary depending upon the components being mixed and the type of shaping operation to which the composition is to be subjected thus, for example, the tertiary peroxide may be incorporated into the soluble ethylene polymer by milling on hot rolls at about 120° C.–125° C. or somewhat higher. The composition may be prepared by adding the tertiary peroxide to finely-divided ethylene polymer and the mixture tumbled in a barrel at room temperature. In using this method when uncompacted ethylene polymer is desired for extrusion, it is advantageous to blend a concentrate of uncompacted "fluff" ethylene polymer containing the tertiary peroxide with the regular compacted molding powder prior to extrusion.

After the blend of ethylene polymer and tertiary peroxide has been prepared by one method or another, it may then be extruded, molded, calendered, or otherwise shaped into a variety of articles, the temperature of the composition during the shaping operation being maintained no higher than 180° C. The temperature at which the shaping operation takes place, may be varied quite widely from the maximum of 180° C. down to 110° C. although it is preferred that the operation be carried out between 150° C. and 180° C. Clearly, the optimum temperature will depend to a certain extent both on the specific tertiary peroxide used and the type of shaping operation being carried out.

After the soluble polymer has been shaped, it is subjected to a final heat treatment at a temperature of 180° C.–250° C. This final heat treatment cross-links the polymer, converting in a matter of one to sixty minutes from 50% to 95% by weight thereof from the soluble to the form insoluble in boiling trichloroethylene, depending on the heat treating temperature and the activity of the specific tertiary peroxide used. It is preferred to heat the polymer between 190° C. and 210° C.

Where the ethylene polymer composition is to be extruded, the tertiary peroxide may be incorporated into the polymer by dispensing either a liquid tertiary peroxide or a solution of a solid tertiary peroxide from a chamber attached to the head of the extrusion machine. The peroxide is fed from the chamber at a controlled rate directly into the heated polymer in the head of the machine before the polymer reaches the die. This method of incorporation is advantageous in some instances when working with an active tertiary peroxide having a high vapor pressure where it is expedient to minimize the time of exposure of the peroxide to elevated temperatures prior to the final heat treatment step. In extruding the polymer composition on wire, it is also preferred to preheat the wire to about 120° C. prior to contact with the composition.

Although it is preferred that the final heat treatment of the shaped polymer be carried out at a temperature no lower than 190° C. which is some 10° C. higher than the maximum temperature used in shaping the polymer, actually the polymer may be shaped at 180° C. and the final heat treatment carried out at approximately 180° C. The reason for this apparent contradiction is that the temperature of the polymer need not be maintained at 180° C. in the shaping operation long enough for cross-linking thereof to progress to any noticeable degree but cross-linking of the shaped polymer is effected thereafter by a more prolonged heating at substantially this same temperature. When the final heat treatment is carried out at 180° C. or only slightly above that temperature, the time required for insolubilizing a substantial proportion of the polymer is considerably longer than in the case where a higher temperature is used and it is because of this that a higher temperature is preferred.

The following examples in which all parts are given by weight unless otherwise specified, illustrate specific embodiments of this invention.

*Example I*

97 parts of soluble ethylene polymer were rolled on a two-roll mill heated to 115° C. and then removed from the rolls. The rolls were cooled to 104° C., the preheated polymer returned to the rolls, and 3 parts of tertiary-butyl pentamethylpropyl peroxide were then mixed into the polymer. The composition was removed from the rolls, cooled and then comminuted in a Ball and Jewell cutter to ⅛" molding powder. This molding powder was fed to a No. 1 Royle extrusion machine having a shallow screw and a pressure die, the die being heated to approximately 140° C. The composition was extruded over a single strand copper wire 25 mils in diameter to give a coating 110 mils thick. The extrusion proceeded smoothly at a rate of 50–75 feet per minute and the coated wire was led through a hot water bath as it issued from the head of the machine. The coating was uniformly smooth, entirely free of bubbles and waviness, and the surface had a polished appearance, all of which indicated that no cross-linking of the polymer had taken place.

A piece of the coated wire was heated in an air circulating oven at 180° C. for twenty minutes. The coating after this heat treatment had a smooth glossy surface and was still free from bubbles. To determine whether the polymer had been cross-linked as a result of this heat treatment, the coating was stripped from the wire and extracted in boiling trichloroethylene for eight hours. The extraction showed 70% of the polymer was insoluble in the boiling solvent. Thus, there was obtained a cross-linked polymer coating on wire which coating was both smooth and flawless and, at the same time, possessed the inherent advantages derived from the cross-linked polymer.

Rather than conducting the final heat treatment in an air circulating oven as above, the coated wire may be led as it issues from the head of the extrusion machine, directly through a tube or chamber heated to the desired heat-treating temperature, thereby affording a continuous process combining the extrusion and cross-linking steps. This continuous process is particularly adapted for commercial extrusion operations.

*Example II*

The following two polymer compositions were prepared by mixing the ingredients on rolls as described in Example I:

|  | Parts |
|---|---|
| A. Soluble ethylene polymer | 97 |
| Tertiary-butyl perbenzoate | 3 |
| B. Soluble ethylene polymer | 97.1 |
| Tertiary-butyl pentamethylethyl peroxide | 2.9 |

A sample of wire coated with composition A was prepared by feeding that composition in the form of molding powder to a No. 0 Royle extrusion machine through which was drawn a single strand copper wire 30 mils in diameter. The temperature of the extrusion die was kept at 130° C.–140° C. and the temperature of the cylinder was held at 160° C. A second sample of wire coated with composition B was prepared in similar manner and it was found that each wire had a coating of about 70 mils thick. Composition A gave a coating which had a sandpaper finish caused by premature cross-linking of the polymer in the extrusion machine, whereas composition B yielded a very smooth and high-polished coating. After heating both coated wires at 200°

C. for twenty minutes in an air oven, each coating was extracted in boiling trichloroethylene for fifteen hours. Sample A contained 60.5% insoluble matter while sample B contained 63% insoluble matter.

The wire having the composition A coating was not acceptable as a wire insulation due to the rough surface of the coating. The non-uniform thickness of this coating, with some depressions so deep they almost bared the wire, contributed to failure of this wire to pass the standard electrical tests for high-frequency insulation. As contrasted to this, the wire coated with composition B was free from surface imperfections and passed the standard high-frequency electrical tests and in every respect was a highly acceptable insulated wire.

This example illustrates the difference between using a curing or cross-linking agent which has the effect of causing cross-linking during the shaping step as exemplified in the wire coated with composition A, and a curing agent which does not cause cross-linking during this step. Sample A employs a compound known to be a curing or cross-linking agent but outside the scope of this invention while sample B employed one of the preferred cross-linking agents of the present invention.

*Example III*

95 parts of finely-divided, uncompacted soluble ethylene polymer were tumbled with 5 parts of tertiary-butyl pentamethylpropyl peroxide in a drum at room temperature. The resulting blend was compression molded into a sheet in a press at 200° C. for fifteen minutes at 5,000 lbs. per square inch. A sample of the compression molded sheet was extracted for fifteen hours in boiling trichloroethylene and found to contain 75% insoluble matter.

A second sample of this compression molded sheet was placed in a Williams parallel plate plastometer at 150° C. under a pressure of 11 lbs. per square inch and the percent deformation of the sample was found to be 10% after two hours and 13% after twenty-four hours. The deformation of a similarly compression molded sample of unmodified ethylene polymer (containing no tertiary peroxide) measured under the same conditions in the Williams plastometer was 100% after 24 hours.

This example illustrates two things, first, the marked improvement in the resistance to deformation at elevated temperatures of the cross-linked polymer over unmodified polymer and, secondly, the adaptability of the polymer compositions of this invention to molding procedures wherein the shaping of the polymer occurs at a temperature high enough so that cross-linking takes place simultaneously. If there is no disadvantage in having the polymer set up during the shaping operation, as in this case, it is not necessary to give the shaped article a separate final heat treatment to effect cross-linking; ordinarily, it is more efficient to effect the shaping and cross-linking simultaneously under such circumstances.

It will be understood that the above examples are merely illustrative and that the present invention broadly comprises employing a composition essentially composed of a normally solid, soluble polymer of ethylene containing 1%–10%, by weight thereof, of a tertiary peroxide of the type herein considered and, process-wise, the shaping of ethylene polymer containing the tertiary peroxide at a temperature of 110° C.–180° C. and thereafter heating the shaped polymer at 180° C.–250° C. until at least 50% of the polymer is insoluble in boiling trichloroethylene.

It will be apparent that this invention in its most advantageous form is dependent on a quite specific behavior or effect of the tertiary peroxide, namely, that it will not cause the ethylene polymer to cross-link at temperatures conventionally used in shaping the polymer but will efficiently promote cross-linking above such temperatures and below the temperature at which the polymer might be injured. As could be expected, the number of tertiary peroxides having such specific behavior is decidedly limited and the present invention is restricted to a particular group of tertiary peroxides which have been found to exhibit this behavior.

The tertiary peroxides found to meet the above requirements and, hence, those to which this invention is limited, have the formula R—O—O—R' wherein R and R' are saturated, non-aromatic hydrocarbon radicals, the carbon atom attached to each oxygen atom of the peroxide linkage is tertiary, and the sum of the carbon atoms in R and R' is at least eleven and, preferably, is from eleven to sixteen, inclusive. The tertiary peroxides conforming to the foregoing but in which the number of carbon atoms exceeds sixteen, are entirely operative in this invention but they are not as readily prepared or available so, not possessing any particular advantage over the more readily available preferred peroxides, they would not ordinarily be used.

Among the preferred peroxides may be mentioned tertiary-butyl pentamethylethyl peroxide, tertiary-butyl pentamethylpropyl peroxide, di-(triethylmethyl) peroxide, tertiary-butyl 1-methylcyclohexyl peroxide - 1, and di(pentamethylpropyl) peroxide. It will be seen from the foregoing that R and R' in the formula may be either aliphatic or mixed aliphatic-alicyclic hydrocarbon radicals. This class of tertiary peroxides, however, excludes those having less than eleven carbon atoms and also excludes those in which the radicals R and R' are aromatic in character or contain unsaturated linkages. It is immaterial whether the hydrocarbon radicals R and R' are the same or different. Further, mixtures of two or more pure tertiary peroxides may be used as well as mixtures of isomers which are difficult or uneconomical to separate.

The tertiary peroxides of this invention may be prepared by any of the methods known in the art. For example, recent methods of preparing these peroxides have been described by Milas and Surgenor, J. Am. Chem. Soc., 68, 643–644 (1946); Milas and Perry, J. Am. Chem. Soc., 68, 1938–40 (1946); Rust et al., U. S. Patent 2,403,758; and Vaughan et al., U. S. Patent 2,403,771.

The proportion of the tertiary peroxide to be incorporated in the ethylene polymer will in general vary between 1% and 10% by weight of the polymer, the optimum proportion depending on the activity of the peroxide selected, the time and temperature of heat treatment, and the degree of cross-linking desired in the polymer. These tertiary peroxides vary to a certain extent in their activity and for the more active peroxides such as tertiary-butyl pentamethylpropyl peroxide, from 2%–5% of the peroxide is usually sufficient to produce greater than 70% insoluble polymer when the ethylene polymer containing the peroxide is heated in the preferred range of 190° C.–210° C. for two to thirty minutes. It would be highly unusual if it were advantageous to use a proportion of the peroxide outside of the range of 1%–10% by weight of the polymer. To obtain substantial advantage from the cross-linking of the polymer, the polymer should be cross-linked to the extent that it contains at least 50% insoluble matter and it is preferred that the polymer should be more than 70% insoluble.

In contrast with the tertiary peroxides of this invention, compounds such as di(tertiary-butyl) peroxide and tertiary-butyl perbenzoate are effective cross-linking agents for ethylene polymer but ethylene polymer containing these latter two peroxy compounds cannot be formed into useful articles at elevated temperatures normally used in shaping operations in the art, without simultaneous cross-linking taking place, as shown by the difference in extrudability and surface appearance of the shaped articles. This is illustrated in Example II. Such peroxy compounds are not included within the scope of this invention.

Other additives may be incorporated into the ethylene polymer together with the tertiary peroxides provided the nature of these additives does not interfere with or inhibit the cross-linking action of the peroxides. Examples of other additives are heat and light stabilizers; fillers; lubricants; pigments and dyes; other vulcanizing agents; antistatic agents, such as partially esterified polyhydric alcohol esters of fatty acids (e. g. glyceryl monostearate, glyceryl monolaurate, glyceryl monooleate, propylene glycol monolaurate, ethylene glycol monolaurate); other resins and elastomers (e. g. polystyrene and polyisobutylene); and the like.

The most important advantage of this invention is the fact that at temperatures above the softening point of the ordinarily available, normally solid, soluble ethylene polymer (105–107° C.) and under loads ranging up to 11 lbs. per square inch, the cross-linked polymer of this invention will flow only to the extent of approximately 14% whereas unmodified polymer (containing no peroxide) will deform completely (i. e. 100%). Furthermore, on removing the load, the cross-linked polymer will recover in a short time to the extent of about 95%. Of course, the greater the load, the larger the deformation of the cross-linked polymer and vice versa. This property of the cross-linked polymer is of greatest use in the electrical insulation field where higher service temperatures of ethylene polymer insulated wires and cables have been sought ever since the commercial introduction of this polymer as a low-loss, solid, semi-flexible dielectric. The use of cross-linked ethylene polymer permits the extension of service temperatures of insulated cables above the maximum of 85° C. permitted for unmodified polymer, for, should overloads of current occur, there would be, in most cases, no migration of the conductor even if the cross-linked polymer insulation were completely melted.

The process described in the aforementioned Pinkney et al. application for curing ethylene polymer effects improvement in the resistance of the polymer to deformation under load, but one fault in that process is that it is not commercially practical for shaping the polymer/cross-linking agent composition without some simultaneous cross-linking taking place. It was not until the present invention that a practical and economical process was available for cross-linking ethylene polymer in existing commercial equipment, and, particularly, for shaping ethylene polymer without cross-linking, followed by cross-linking the formed structure. For example, the compositions of this invention may be prepared by blending the tertiary peroxide and any other desired additives with the ethylene polymer on hot rolls or in a Banbury mixer or other conventional mixing equipment without particular care being exercised and without the necessity of using solvents, although the latter are by no means inoperative in the present invention. In fact, alternate forms of the compositions may be either a dispersion of ethylene polymer in an aqueous medium or in organic liquid media containing the peroxide; or a porous ethylene polymer of low density containing the peroxide.

The compositions, prepared as above in the form of dry molding powders, solutions, aqueous dispersions, or porous masses, are most advantageously used for extrusion into filaments, sheets, rods, tubes and over wire to produce insulating coatings. Although the use of the compositions has been directed in this specification chiefly to extrusion processes, the compositions also may be injection and compression molded, calendered, and otherwise fabricated into articles of various shapes. These articles may finally be heat-treated at temperatures above their fabricating temperatures to cross-link the polythene, rendering the articles much less soluble in hot solvents for unmodified ethylene polymer as well as more resistant to deformation under load at elevated temperatures. Examples of articles which may be fabricated of the polymer compositions of this invention and subsequently treated to cross-link the polymer are electrical parts such as insulation, grommets, plugs, insulator caps and bases, and similar fittings; cups and dishes; container closures; and gaskets.

As many apparently widely different embodiments of this invention may be made without departing from the spirit and scope thereof, it is to be understood that the invention is not limited to the specific embodiments thereof except as defined in the appended claims.

I claim:

1. Process which comprises shaping at a temperature of 110° C.–180° C. a normally solid polymer of ethylene, said polymer being soluble in boiling trichloroethylene, containing 1%–10%, by weight thereof, of a tertiary peroxide of the formula R—O—O—R' wherein R and R' are saturated, non-aromatic hydrocarbon radicals, the carbon atom attached to each oxygen atom of the peroxide linkage is tertiary, and the sum of the carbon atoms in R and R' is from eleven to sixteen, inclusive, and thereafter heating said shaped polymer at 180° C.–250° C. until at least 50% of said polymer is insoluble in boiling trichloroethylene.

2. Process as set forth in claim 1 wherein said polymer is shaped at a temperature of 150° C.–180° C. and thereafter heated at 190° C.–210° C. until at least 50% of said polymer is insoluble in boiling trichloroethylene.

3. Process which comprises shaping at a temperature of 110° C.–180° C. a normally solid polymer of ethylene, said polymer being soluble in boiling trichloroethylene, containing 2%–5%, by weight thereof, of a tertiary peroxide of the formula R—O—O—R' wherein R and R' are saturated, non-aromatic hydrocarbon radicals, the carbon atom attached to each oxygen atom of the peroxide linkage is tertiary, and the sum of the carbon atoms in R and R' is from eleven to sixteen, inclusive, and thereafter heating said shaped polymer at 180° C.–250° C. until at least 50% of said polymer is insoluble in boiling trichloroethylene.

4. Process as set forth in claim 3 wherein said polymer is shaped at a temperature of 150° C.–180° C. and thereafter heated at 190° C.–210° C. until at least 50% of said polymer is insoluble in boiling trichloroethylene.

5. Process of coating wire which comprises extruding at a temperature of 110° C.–180° C. a normally solid polymer of ethylene, said polymer being soluble in boiling trichloroethylene, containing 1%–10%, by weight thereof, of a tertiary peroxide of the formula R—O—O—R' wherein R and R' are saturated, non-aromatic hydrocarbon radicals, the carbon atom attached to each oxygen atom of the peroxide linkage is tertiary, and the sum of the carbon atoms in R and R' is from eleven to sixteen, inclusive, onto a wire and thereafter heating said wire thus coated at 180° C.–250° C. until at least 50% of said polymer coated on said wire is insoluble in boiling trichloroethylene.

6. Process of coating wire which comprises extruding at a temperature of 150° C.–180° C. a normally solid polymer of ethylene, said polymer being soluble in boiling trichloroethylene, containing 1%–10%, by weight thereof, of a tertiary peroxide of the formula R—O—O—R' wherein R and R' are saturated, non-aromatic hydrocarbon radicals, the carbon atom attached to each oxygen atom of the peroxide linkage is tertiary, and the sum of the carbon atoms in R and R' is from eleven to sixteen, inclusive, on to a wire and thereafter heating said wire thus coated at 190° C.–210° C. until at least 50% of said polymer coated on said wire is insoluble in boiling trichloroethylene.

7. A shaped article obtained by the process set forth in claim 1.

8. A shaped article obtained by the process set forth in claim 4.

9. A coated wire obtained by the process set forth in claim 5.

ROBERT EUGENE KENT.

REFERENCES CITED

The following references are of record in the file of this patent:

UNITED STATES PATENTS

| Number | Name | Date |
| --- | --- | --- |
| 2,403,758 | Rust et al. | July 9, 1946 |
| 2,426,476 | Vaughan et al. | Aug. 26, 1947 |
| 2,430,993 | Rehner | Nov. 18, 1947 |
| 2,450,451 | Schmerling | Oct. 5, 1948 |
| 2,456,304 | Morin | Dec. 14, 1948 |

OTHER REFERENCES

Myers "Polyethylene," Plastics, Sept. 1944, pages 39, 40, 42, 43, 100.